Dec. 15, 1942.           S. TROTT           2,305,360
FISHING REEL
Filed Oct. 7, 1940           2 Sheets-Sheet 1

Scott Trott
INVENTOR.

BY CA Knowles.
ATTORNEYS.

Dec. 15, 1942.  S. TROTT  2,305,360
FISHING REEL
Filed Oct. 7, 1940  2 Sheets-Sheet 2

Scott Trott
INVENTOR.

BY C. A. Knowles.
ATTORNEYS.

Patented Dec. 15, 1942

2,305,360

UNITED STATES PATENT OFFICE 2,305,360

FISHING REEL

Scott Trott, Detroit, Mich.

Application October 7, 1940, Serial No. 360,194

4 Claims. (Cl. 242—84.4)

This invention relates to fishing reels, the primary object of the invention being to provide means to accurately feed the fishing line to the reel, as the line is being wound thereon, and to insure the accurate unreeling of the fishing line, when the line is being paid out.

An important object of the invention is to provide a reel including a rotary line guide through which the line moves, means being provided for paying out the line and holding the line taut between the reel and line guide, thereby eliminating slack in the line to cause back lash.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
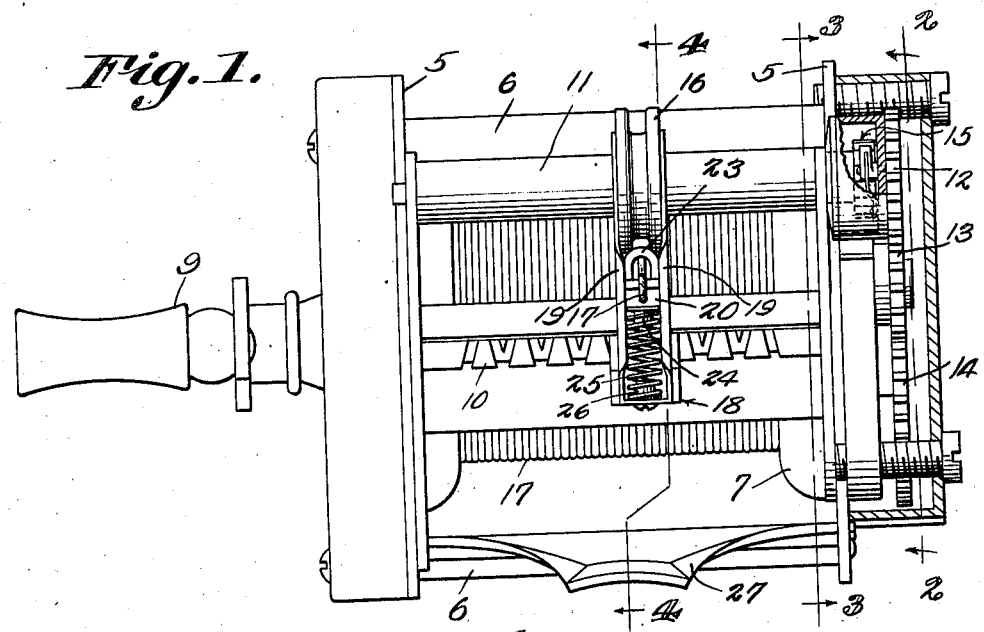
Figure 1 is a sectional view taken on line 1—1 of Figure 2, showing the gear casing at one side of the reel, in section.

Referring to the drawings in detail, the reel embodies a frame comprising end members 5 which are connected and held in spaced relation with respect to each other, by means of the spacers 6.

The reel on which the fishing line is wound, is indicated by the reference character 7, the reel being mounted on the shaft 8, that in turn is journalled in suitable bearings formed in the end members.

Figure 2:
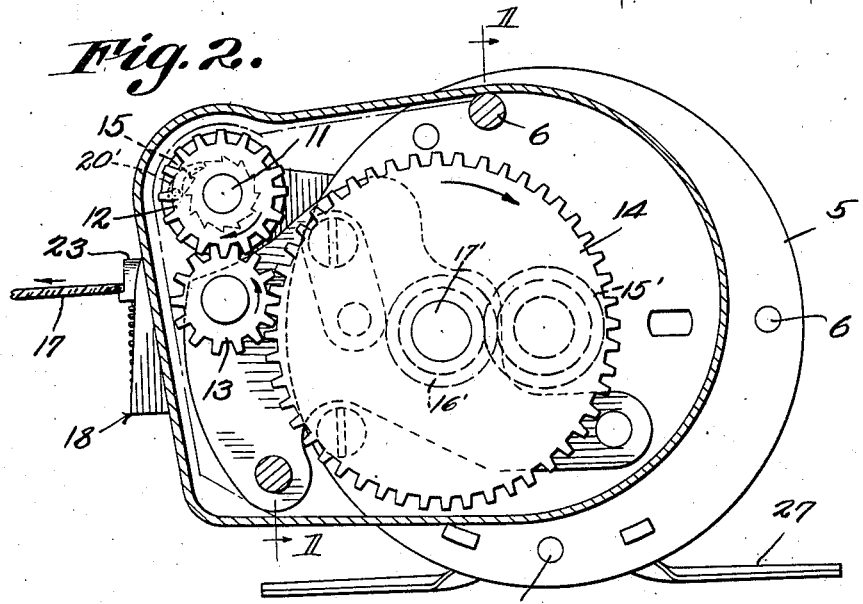
Figure 2 is a sectional view taken on line 2—2 of Figure 1.
Figure 6:
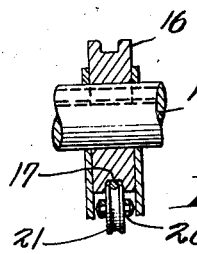
Figure 6 is a sectional view taken on line 6—6 of Figure 5.
Figure 3:
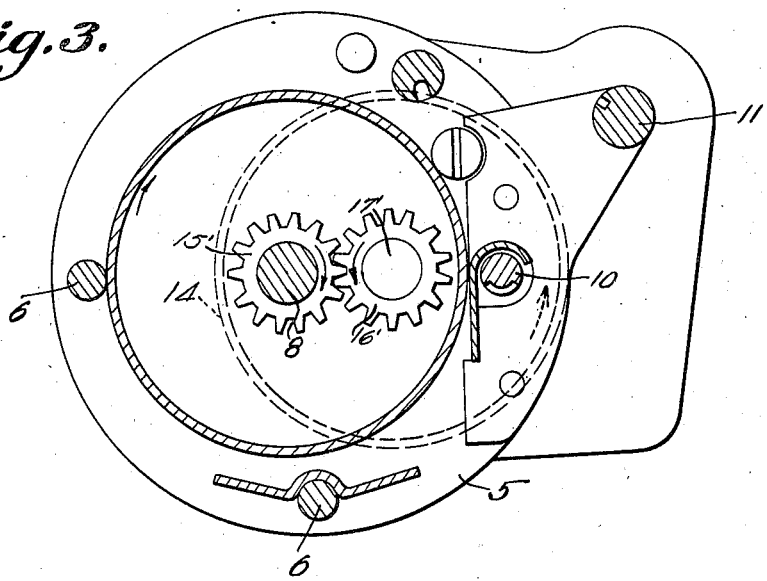
Figure 3 is a sectional view taken on line 3—3 of Figure 1.
Figure 4:
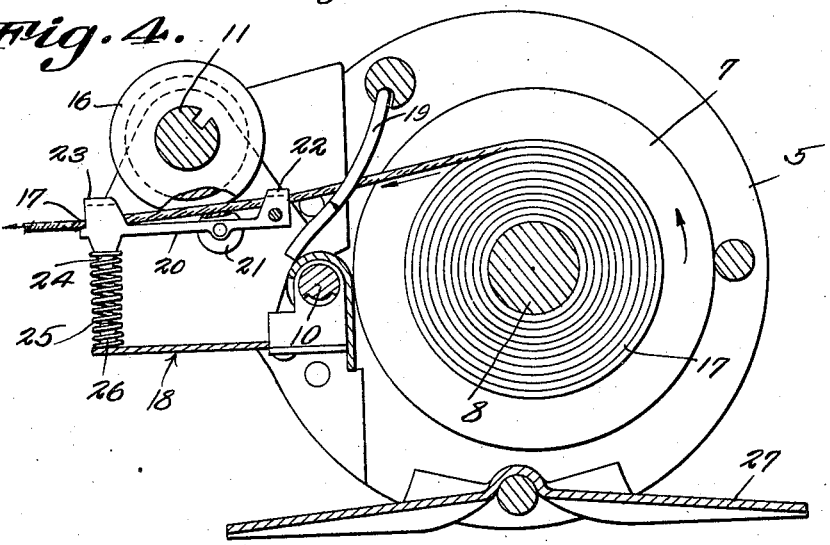
Figure 4 is a sectional view taken on line 4—4 of Figure 1.
Figure 5:
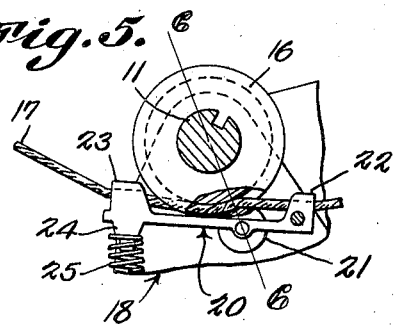
Figure 5 is a fragmental detail view illustrating the means for pressing the line into engagement with the feed pulley.

The operating handle, by means of which the reel is rotated, is indicated by the reference character 9 and transmits movement to the reel, through suitable gearing housed in one of the end members of the reel frame, the gearing being of the usual and well known construction. At the end of reel shaft 8, opposite to the handle 9, is pinion 15' that meshes with the pinion 16', mounted on the shaft 17' which extends through the end member 5, and on which shaft is also mounted the pinion 14. Thus it will be seen that when the line is unwinding from the reel, the pinions 14, 13 and 12 are rotated in the direction of the arrows shown in Fig. 2 of the drawings, to operate the gearing, that in turn operates the line feed pulley 16.

The gearing used in operating the reel, also operates the right and left screw-threaded shaft 10 forming a part of the usual fishing line reel. The reference character 11 designates a supporting shaft on which the line guide pulley 16 is mounted, the shaft being operated by means of the pinion 12 that in turn is operated through the pinions 13 and 14, the pinion 14 being operated by the gears 15' and 16' as previously stated. A clutch mechanism comprising the ratchet wheel 15 secured on the shaft 11, and pawl 20' mounted on gear 12, provides means whereby the shaft 11 is driven by the gears in one direction and may rotate independently thereof in the other. Due to this construction, the feed pulley is driven by the reel upon rotation in the unwinding direction, but may rotate freely when the reel is rotated in a direction to wind in the line. The shaft 11, is formed with a longitudinal slot to receive a suitable key carried by the pulley 16, whereby the pulley 16 may rotate with the shaft 11 and at the same time move longitudinally thereof. The grooved pulley 16 forms a part of the line guide, the line, which is indicated at 17 being fed to and from the reel by said pulley 16. The line guide also includes a carriage indicated by the reference character 18, the carriage being formed with threads cooperating with the right and left screw threads of the shaft 10, so that when the reel is in operation, the carriage will be fed transversely of the reel, guiding the line, to insure the proper winding of the line on the reel. Guide fingers 19 extend inwardly from the carriage, and are spaced apart, to permit the line 17 to move therebetween.

Mounted within the carriage, and disposed directly under the pulley 16, is a pivoted arm 20 on which the substantially small pulley 21 is mounted. The pulley 21 being also grooved to permit the line 17 to move therethrough. At the inner end of the arm 20 is a lug 22 which is formed with an eye, through which the line moves, the opposite end of the arm being formed with an enlargement 23 which is also formed with an opening, through which the line moves.

Depending from the forward end of the arm 20 is an extension 24 that fits into the upper end of the coiled spring 25, the lower end of the coiled spring being fitted over the pin 26 that rises from the bottom of the carriage 18. The arm 20 and pulley 21 provide an efficient line feeding means, whereby the line will be held taut between the reel and feed pulley 16 at all times, thereby insuring against back lash. It will be seen that when a pull is exerted on the line, the line will exert a pressure downwardly on the outer end of the arm 20, freeing the line from the feeding action of pulley 16 and also relieving the wheel from any drag action due to slipping of pulley 16 over the line in a feeding direction.

Due to this construction, the movements of the line will be automatically controlled. When the line is running out under tension at the beginning of a cast, no feed is required and the feeding action is consequently released by pressure of the line on the outer end of arm 20. However as the speed of the line decreases and the reel gains speed, the line will become slack and would normally back lash. However, in the device of the present invention, slack in the line permits the outer end of arm 20 to rise and bring the line into feeding engagement with pulley 16. Since pulley 16 rotates with a peripheral speed equal to or greater than that of the reel, its feeding action will keep the line taut between itself and the reel, thus preventing back lash from occurring. If it were not for the clutch mechanism 15, the feeding in of the line would be faster than the line could be wound on the reel, with resultant slack in the line between the reel and feed pulley 16 which would cause tangling. However, use of the clutch construction shown permits the line to be wound upon the reel without any feeding by the pulley 16, which merely rotates idly due to frictional contact with the line.

The reference character 27, designates the usual supporting member, by means of which the reel may be readily secured to a fishing pole.

What is claimed is:

1. A fishing line reel comprising a frame, a reel mounted on the frame and on which a fishing line is wound, a line guide including a shaft mounted on the frame and rotated simultaneously with the reel, said line guide also embodying a carriage mounted for movement longitudinally of the shaft, a grooved pulley secured to the shaft to rotate therewith, a spring pressed pivoted arm mounted on the carriage and adapted to engage a line moving through the groove of the pulley, forcing the line into engagement with the pulley, whereby the line is fed through the line guide as the reel and pulley are rotated, holding the length of line between the pulley and reel taut.

2. A fishing line reel comprising a frame, a reel mounted on the frame and on which a fishing line is wound, a line guide including a shaft mounted in the frame and rotated simultaneously with the reel, said line guide also embodying a carriage mounted for movement longitudinally of the shaft, a grooved pulley secured to the shaft to rotate therewith, a spring pressed pivoted arm mounted in the carriage and adapted to engage the line moving through the groove of the pulley, forcing the line into engagement with the pulley whereby the line is fed through the line guide as the reel and pulley are rotated holding the line taut between the pulley and reel, said arm having an opening adjacent to its outer end, through which the line moves, and said line adapted to move the arm and portion of the line engaging the pulley, away from the pulley, releasing the line when pressure is directed to the outer end of the arm by the line passing through the opening of the arm.

3. A fishing line reel comprising a frame, a reel mounted within the frame, a line guide shaft, gearing including a clutch, adapted to transmit movement of the reel to the line guide shaft when the reel rotates in paying out the line therefrom, said clutch adapted to release the guide line shaft for free rotary movement independently of said reel when the reel rotates in the opposite direction, a line guide splined on the shaft and movable longitudinally of said shaft, said line guide including a pulley and a pivoted member between which the fishing line wound on the reel, moves, said pivoted member adapted to urge the fishing line into engagement with the pulley when the tension on said line is released, whereby the line is fed through the line guide as said pulley rotates, and said pivoted member and line adapted to move away from said pulley releasing the reel for free rotary movement, when the line is moved against the pivoted member in one direction.

4. A fishing line reel comprising a frame, a reel mounted within the frame, a line guide shaft, gearing including a clutch, adapted to transmit movement of the reel to the line guide shaft when the reel rotates in paying out the line therefrom, said clutch adapted to release the line guide shaft for free rotary movement independently of said reel when the reel rotates in the opposite direction, the line guide embodying a pulley, secured to said line guide shaft to rotate therewith and said pulley adapted to feed the line from the reel when the reel is rotated.

SCOTT TROTT.